Figure 1:
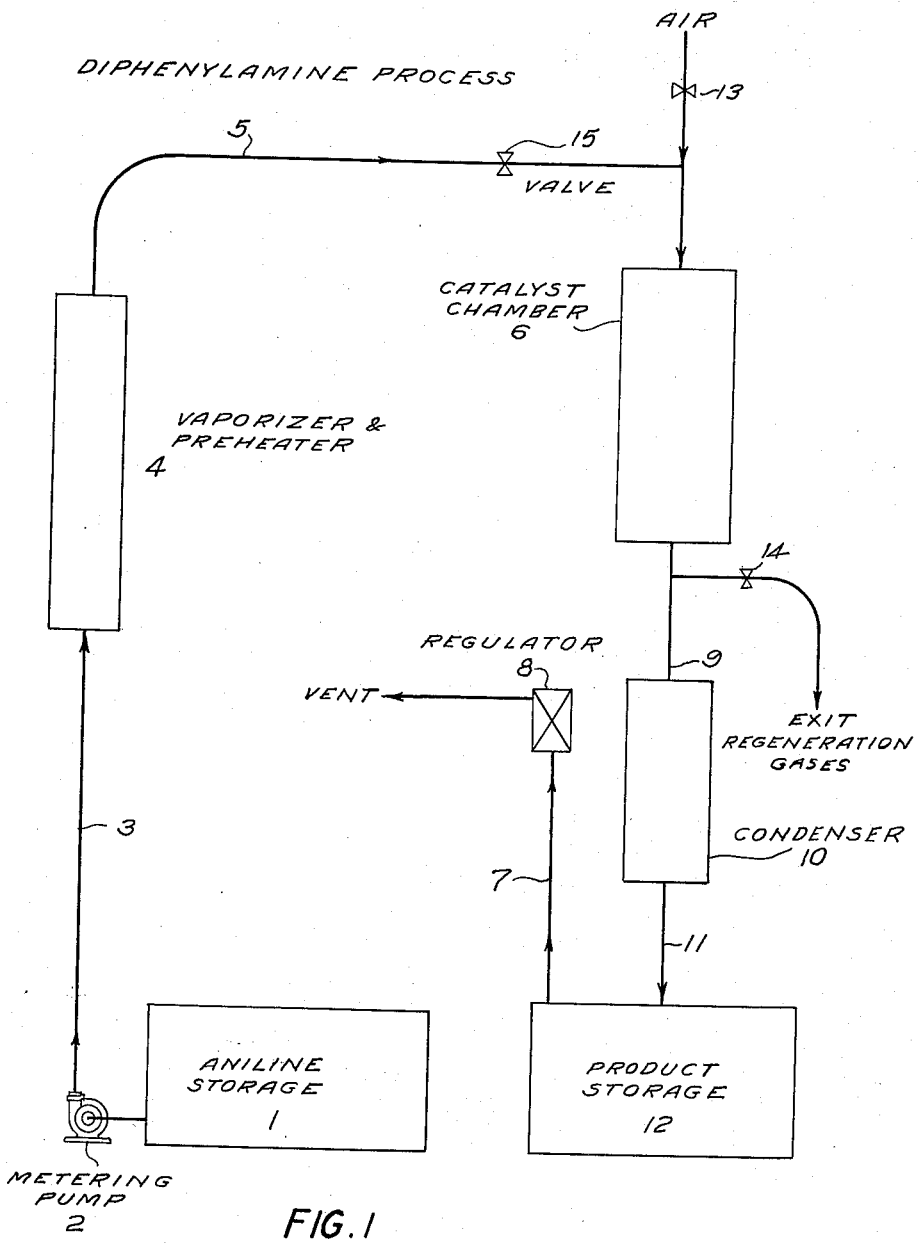

United States Patent Office 3,118,944
Patented Jan. 21, 1964

3,118,944
VAPOR PHASE PROCESS FOR THE MANUFACTURE OF DIPHENYLAMINE
Gilbert I. Addis, Plainfield, N.J., assignor to American Cyanamid Company, New York, N.Y., a corporation of Maine
Filed Aug. 7, 1959, Ser. No. 832,401
7 Claims. (Cl. 260—576)

The present invention relates to a catalytic vapor-phase process for the conversion of aniline to diphenylamine and more particularly to the use of high feed rates and superatmospheric pressures therein.

In the past, a number of processes have been proposed for accomplishing this reaction in the vapor phase. One of the best is that of U.S. Patent 2,098,039. Therein, aniline vapors are passed over a catalyst at some 400°–450° C. Increasing the operating pressure was said to have no appreciable effect on the conversion rate. Preferably, therefore, no overpressure was used except that needed to overcome the apparatus back pressure to permit discharge at about atmospheric pressure. A metal oxide catalyst was used, usually of aluminum or titanium. Reacted products were condensed, diphenylamine being then distilled off and any recovered aniline being recycled.

Unfortunately, in this and similar proposals, yields were low and aniline losses particularly as coke deposited on the catalyst, were high. Furthermore, regeneration of the catalyst presented several practical difficulties. Therefore, despite the many advantages inherent in such vapor phase operation, it did not achieve acceptance for use in commercial production. Diarylamines generally, and diphenylamine in particular, continued to be produced principally by known liquid phase procedures which involved heating the amine in the presence of a catalyst.

Hereinafter, for purposes of simplification, the term "DPA" will be used to designate diphenylamine.

Among the difficulties with previously proposed vapor-phase processes, the most troublesome were found to be: low single-pass conversion rate, low overall yields and high losses of aniline per unit of product. The latter factor is particularly embarrassing, for example, some eight to ten or more pounds of aniline per hundred pounds of diphenylamine being commonly lost as coke deposited on the catalyst. These high coke formation rates not only were direct losses but required frequent shutdowns to burn off the coke and reactivate the catalyst.

Under otherwise fixed conditions, the methods previously proposed required the use of low feed rates to obtain conversions as high as ten percent. While the single-pass conversion rate could be raised by using still lower feed rates, this also lowered an already impractical production rate and increased the aniline losses. Unless the aniline lost by coke formation could be reduced to below about 5 pounds/100 pounds of DPA produced and the rate of production of DPA per unit volume of catalyst used could be markedly increased, no such process can be accepted as commercially satisfactory. In the past it was considered this could not be economically accomplished.

Nevertheless, if a continuous vapor-phase process which is not subject to these difficulties could be found, the other advantages of this type of operation would make it highly attractive for commercial development. Despite the many years in which such an improvement has been desired, according to the present invention, a major portion of these difficulties have been overcome by combining several simple but surprisingly effective modifications.

In general, the present invention may be described as comprising conducting undiluted aniline vapor at a rate equivalent to about 50–1500 grams per hour per 100 cubic centimeters of catalyst, under relatively high superatmospheric pressure, into and through a reaction chamber wherein a suitable metal oxide catalyst is maintained at some 400–550° C.; discharging so-treated reacted mixture from the reaction chamber, and separating therefrom product diphenylamine from excess aniline and by-product ammonia.

Successful operation according to the present invention is the result of several discoveries. Primarily, however, it depends on the discovery that the prior art teachings are wrong in several respects. Somewhat higher temperatures are desirable. The teaching that low feed rates are necessary to obtain high conversion is both wrong and irrelevant. Most important, the teaching that pressures higher than required to discharge at about atmospheric pressure are desirable and do not appreciably increase conversion rate is equally erroneous.

In operation, practice of the process of the present invention which ignores their teachings is not only successful but is particularly advantageous in that it results in far better production from a fixed equipment. It markedly increased the DPA production per unit time using a fixed volume of catalyst. Moreover, and especially surprising in view of the prior art teachings, the increase in production does not cause a proportionate increase in the coke deposited on the catalyst. In fact the coke produced per unit production of DPA is markedly decreased.

Figure 2:
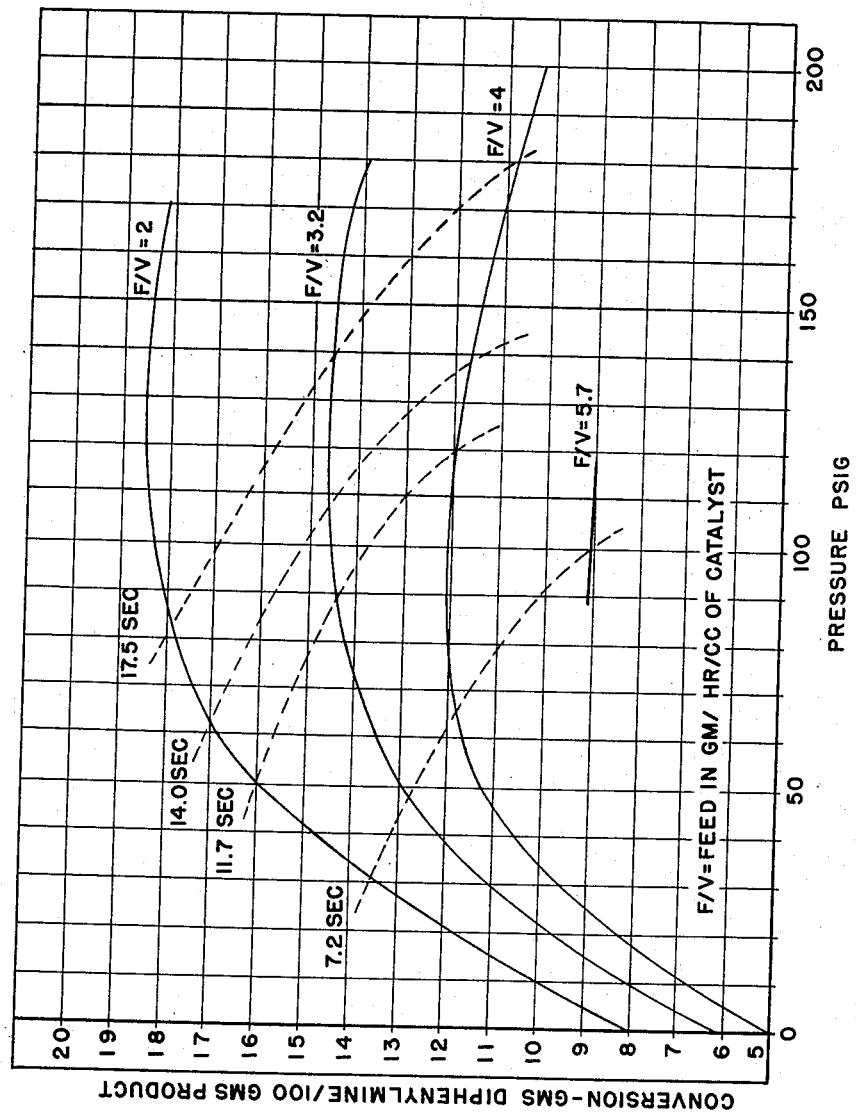

When described in the general terms used above, the process of the present invention may seem much like the previously-known process also discussed above. However, in operation the similarity is more apparent than real. There are several distinguishing features. Accordingly, the invention will be more fully discussed in conjunction with the accompanying drawings wherein:

FIGURE 1 is a flowsheet of the overall process, and
FIGURE 2 is a chart showing, for several feed rates, the ratios of DPA content to total condensate plotted versus the reaction pressure.

Thereafter, the similarities and then the distinctions between previous processes and the present invention may and will be more easily pointed out.

Referring to the FIGURE 1, liquid aniline is pumped at a uniform rate from storage tank 1 by metering pump 2 through line 3 into the externally heated vessel 4 which serves as preheater and vaporizer. In vessel 4 aniline is vaporized and the vapors heated to a temperature of from about 400° to about 500° C. Hot aniline vapors leave by line 5 and pass through catalyst chamber 6 which is maintained at from about 400° C. to about 550° C. Product vapors from the chamber 6 leave by line 9 and pass through condenser 10 and then to storage 12 by line 11. A pressure regulator 8 maintains any desired operating pressure on the entire system between feed pump 2 and product storage 12. Reacted product, as received in storage tank 12, contains aniline and some dissolved ammonia in addition to the DPA.

Most of the gaseous ammonia generated in the catalyst chamber escapes by line 7 from the DPA storage tank. By-product ammonia may be recovered by conventional means. The DPA product is drawn from storage tank 12 and purified by distillation, or other separation procedures commonly known to those skilled in the art. The specific distillation or other procedure forms no part of the present invention.

During the production cycle, presumably due to coke deposition, the catalyst gradually loses its activity. It can be restored to its original activity by shutting off the supply of aniline, closing valve 15, opening valves 13 and 14, and purging the catalyst chamber with inert gas. Thereafter, air at a controlled rate is passed through the catalyst bed until the $CO_2$ content of the exit gases indicates that the regeneration is substantially complete. Air flow is then shut off and inert gas again passed through the catalyst chamber to purge any retained oxygen. Valves 13 and 14 are then closed, valve 15 is opened, and the feed of aniline resumed.

In FIGURE 2, the yield advantages obtained by using pressure are illustrated graphically. The figure shows the gauge pressure in pounds per square inch as the abscissa and as the ordinate the rate of conversion to DPA in grams of DPA/100 grams of crude converter product. The solid lines represent the yields at three different feed rates of aniline (abbreviated $F/V$, and defined as grams per hour per cc. of catalyst.

The dotted lines represent yields at constant contact times, calculated from the liquid aniline feed rate, Avogadro's number, the gas laws and the volume of catalyst used. The feed rates and contact times illustrated are shown for each curve. The data for these curves was collected from many experiments, a portion of which are used below in one or more of the examples in this specification.

Like the above-described earlier process, suitable catalysts for use in the process are so-called "deamination" or "alkylation" catalysts comprising activated alumina and titania and mixtures thereof. However, the catalyst which is preferred in the process of the invention is an alumina gel catalyst obtained by precipitating alumina from sodium aluminate solution with an acid. This gel is ignited to form an amorphous, non-crystalline alumina characterized as gamma-alumina by X-ray analysis. Such a product may have a surface area of some 100–400 square meters per gram, a pore volume in the neighborhood of 0.50 cubic centimeters per gram, and a bulk density of about 65 grams per 100 cc. Loss on ignition at 1100° C. will vary from 8.5 to 10%. A typical analysis and the usual range of composition of such catalysts after ignition may be the following:

| Constituent | Typical Analysis (percent) | Usual Range (percent) |
|---|---|---|
| $Al_2O_3$ | 93.8 | 93–100 |
| $SiO_2$ | 5.8 | 0–6.0 |
| $Fe_2O_3$ | 0.2 | 0–0.3 |
| $TiO_2$ | 0.1 | 0–0.3 |
| $Na_2O$ | 0.1 | 0–0.1 |

It will be recognized that other catalysts, for example bauxite, titania gels and mixed oxides may be used in the process. While a bauxite catalyst may be regenerated repeatedly and give satisfactory service over a long period of time, an activated alumina catalyst is particularly preferred because of its greater conversion efficiency. Such a catalyst is also preferred over the equally useable titania catalysts because of lower cost and greater availability.

In the previously-noted earlier process the preferred reaction temperature range was some 400° to about 450° C. In the present invention, the operable temperature range under some conditions may extend down to about 400° C. However at appreciably below 450° the result is too poor to be useful. A higher temperature in the range of from above 450° up to about 550° C. should be used. In actual operation, the upper limit is usually about 500° C.

Another distinction of the present process is in the basis for selecting the control ranges. The process of this invention is operated to produce the optimum yield of DPA per unit volume of catalyst per unit time. This may not coincide and seldom does with the correct set of conditions to give the maximum single-pass conversion rate. Rather, operating conditions are chosen to maintain a contact time, which for the other conditions, produces the maximum yield per unit of time per converter.

In general, this means that in any one operation the aniline feed rate will be substantially constant. It may vary from as little as about 50 grams of aniline per hour per 100 cubic centimeters of catalyst to as high as about 1500. However in general practice this ratio usually will range from above 55 to about 1000. For operation in any given equipment the contact time is fixed by the selected aniline feed rate, the reaction temperature and the pressure used.

Probably the most important single feature of the present invention is the concept of operating the production cycle at high pressures despite the prior art opinion that superatmospheric operating pressures are undesirable and do not appreciably improve results. Therefore, not only the improved production but the improved conversion rates obtainable at well above atmospheric pressure were completely unexpected. From work carried out at various pressures, it was determined that an improvement began to be obtained even when operating at a pressure as low as 15 lbs./sq. in. gauge (p.s.i.g.). This improvement is even more pronounced if the pressure is further increased, for example to 50 or 100 or 150 p.s.i.g.

However, obtaining an increased conversion rate is not the only reason for using higher operating pressure. An operation which loses more than about five pounds of aniline as coke per 100 pounds of DPA produced is not practical, nor can it be considered successful.

According to this invention, at various feed rates commonly encountered, it has been found this result is obtainable at a minimum pressure between about 40 and about 50 p.s.i.g. Therefore, contra to the prior art preference for atmospheric pressure, according to the present invention, the minimum pressure must be not less than about 40 p.s.i.g. and preferably not less than about 50 p.s.i.g.

Moreover, it has been found in this invention that increasing the pressure above a certain level will not produce proportionately better results. For example, as seen in FIGURE 2, at any constant feed rate ($F/V$); as the pressure is increased above atmospheric the ratio of DPA to aniline in the total product condensate initially increases quite rapidly up to about 40–50 p.s.i.g. Thereafter as pressure is increased, the rate at which the DPA : aniline ratio increases falls off until the ratio passes through a maximum and begins to decrease. This maximum usually occurs between about 90 and about 130 p.s.i.g. at usual feed rates.

As the pressure is increased above that which produces maximum conversion, the ratio decreases. For a fixed feed rate in the ranges commonly encountered, at some pressure between about 150 p.s.i.g. and some 190–200 p.s.i.g., the ratio ordinarily will be no higher than at about 50 p.s.i.g.

Although the maximum conversion for the particular feed rate may occur at about 90–130 p.s.i.g., use of some higher pressure up to about 150 p.s.i.g. may be and frequently is desirable. In many cases operation at a pressure in this marginal range will increase the overall capacity of a fixed apparatus. Above about 150 p.s.i.g., the advantage of the increased capacity usually begins to be offset by the decrease in conversion and increased costs. Accordingly, in most cases the maximum operating pressure will be about 150 p.s.i.g. rather than either the actual pressure at which conversion is at a maximum or at which it has decreased to that ratio obtained at about 40–50 p.s.i.g.

One of the biggest advantages of the present invention is that its greater production of DPA per unit of catalyst is obtained with the completely unexpected decrease in coke formation. Both coking and conversion to DPA are competing reactions. From previous teachings it was to be expected that conditions which favor conversion to DPA would also favor coking. For instance, both coking and conversion to DPA were known to increase with increased contact time, as by decreasing the feed rate with other variables being held constant.

Unexpectedly, however, according to this invention it has been found that using about the same contact time, but using much higher pressures and feed rates than previously considered to be the limiting values, there is a limited operating pressure range over which the expected increase in coke loss is not obtained. In this range, the rate of coke formation does not increase as rapidly as does the rate of conversion to DPA, i.e., less coke is formed per unit weight of DPA produced. This could not be predicted. It was thought that since coking tends to coat the catalyst, the rate of coking should increase faster than that of DPA production which would be reduced by the resultant decrease in catalyst surface area available for conversion contact. The concomitant lower rate of coking and increased production which are obtained when the reaction pressure is within this range are the factors which make this invention a commercially advantageous process.

This invention may be more fully discussed in conjunction with the following examples illustrating the operating procedure. However, these examples are for the purposes of illustration only. Therein, unless otherwise noted all the parts are by weight and all temperatures are in degrees centigrade.

EXAMPLE 1

To illustrate the operation of the overall process described above with reference to FIGURE 1: a catalyst chamber 6 containing an alumina deamination catalyst (sp. g.—0.64) is maintained at about 480° C. Back pressure regulator 8 is set at 30 p.s.i.g. A constant liquid hourly space velocity (grams of aniline per hour per 100 cc. of catalyst) of 232 is maintained into vaporizer 4. Vaporized aniline leaves vaporizer 4 at about 455° C. and is passed through catalyst chamber 6. After 5 hours' operation product storage tank 12 contains 1080 parts of product containing 143 parts of DPA. Recovered, reuseable aniline amounted to 992 parts. The yield of DPA therefore is better than 93% of the theoretical.

Conversion (percent) is calculated as DPA production divided by the aniline feed rate and multiplied by 1.10 (the molecular weight ratio of aniline to DPA for this reaction) times 100. Accordingly, in the above example the conversion is $$\frac{143 \times 1.10 \times 100}{5 \times 232} = 13.6\%$$

After completing the run in Example 1, the catalyst chamber was purged with inert gas by closing valve 15 and opening valves 13 and 14. Thereafter, air was passed through the catalyst chamber 6 for about 45 minutes. Air was introduced at such rates as to keep the maximum temperature within the catalyst chamber from exceeding 600° C. during the regeneration period. Valves 13 and 14 were then closed, valve 15 opened, and feed of aniline was resumed. A similar catalyst reactivation step also was used between runs in the following examples.

The term "liquid hourly space velocity" as defined above, as well as the noted method of calculating "percent conversion" are used in the following discussion.

EXAMPLE 2

In order to illustrate the effect of using increased pressure, the procedure of the process of Example 1 was repeated a number of times. Runs were made of shorter duration while maintaining the catalyst chamber in each run at about 450° C. Runs were made at 0, 30 and 100 p.s.i.g. for several different feed rates (liquid hourly space velocity). In each case, the runs were of shorter duration than in Example 1. However the effect of increased pressure at any one feed rate is quite marked. This may be seen by comparison of the illustrative results shown below in Table I.

*Table I*

| Liquid Hourly Space Velocity | Conversion (Wt. Percent) | | |
|---|---|---|---|
| | 0 p.s.i.g. | 30 p.s.i.g. | 100 p.s.i.g. |
| 55 | 29.2 | 34.2 | 39.0 |
| 150 | 25.2 | 30.0 | 38.1 |
| 250 | 20.3 | 22.0 | 27.5 |

EXAMPLE 3

To illustrate the effect of increasing the reaction temperature, Example 2 was repeated maintaining a reaction temperature of about 460° C. Illustrative results are shown below in Table II.

*Table II*

| Liquid Hourly Space Velocity | Conversion (Wt. Percent) | | |
|---|---|---|---|
| | 0 p.s.i.g. | 30 p.s.i.g. | 100 p.s.i.g. |
| 55 | 31.5 | 40.4 | 41.2 |
| 150 | 23.8 | 38.3 | 40.8 |
| 250 | 21.8 | 22.5 | 33.6 |

EXAMPLE 4

To further illustrate the effect of temperature, Example 2 was repated in part at about 480° C. Somewhat different feed rates were also used for purposes of illustration. Illustrative results are shown in Table III.

*Table III*

| Liquid Hourly Space Velocity | Conversion (Wt. Percent) | | |
|---|---|---|---|
| | 0 p.s.i.g. | 30 p.s.i.g. | 100 p.s.i.g. |
| 76 | 20.8 | | |
| 232 | | 12.3 | |
| 581 | 3.44 | | 9.7 |

As can be seen by comparing the results in Examples 1–4, the advantages obtained by increasing the operating pressure become more pronounced as the operating temperature in the catalyst chamber is increased. These examples also show that merely increasing the feed rate without increasing the pressure does not result in increased conversion.

EXAMPLE 5

To illustrate the use of a different catalyst, the procedure of Example 1 is repeated using a bauxite deamination catalyst having the following physical characteristics:

Assay—
    $Al_2O_3$ _____ percent__ 87.9
    $Fe_2O_3$ _____ do____ 1.0
    $SiO_2$ _____ do____ 7.3
    $TiO_2$ _____ do____ 3.8
Surface area _____ sq. meters/gm__ 178
Pore volume _____ cubic cm./gm__ 0.22
Bulk density _____ gm./100 cubic cm__ 118
Ignition loss (at 1100° C.) _____ wt. percent__ 30.6

Back pressure regulator 8 is set at 100 p.s.i.g., and as in Example 1, vaporized aniline leaves vessel 4 at about 455° C. and is passed through catalyst chamber 6 which is maintained at about 480° C. Illustrative results are shown below in Table IV.

*Table IV*

| Liquid Hourly Space Velocity | Conversion (Wt. Percent) | | |
|---|---|---|---|
| | 0 p.s.i.g. | 30 p.s.i.g. | 100 p.s.i.g. |
| 77 | 6.0 | | |
| 226 | | 4.4 | |
| 557 | | | 3.4 |
| 595 | 0.88 | | |

Because this catalyst is far less efficient than that of Examples 1–4, only a few runs were made. However, they show the same general trend of effect of varying the feed rate at zero pressure and of increasing the operating pressure.

EXAMPLE 6

The procedure used in Example 1 is repeated using an activated titania catalyst. Similar results but with slightly lower conversion are obtained.

As was pointed out above, to be successful a modification of the previously described procedure must be improved as to DPA production per unit time per unit volume of catalyst. As has been illustrated above, this can be done by increasing the pressure and/or the temperature at any particular feed rate but it can not be done by increasing only the feed rate. Further it has been demonstrated that an increase in pressure produces a more marked effect than does increasing the temperature.

However, it was also pointed out that for the improvement to be considered useful or successful, the loss of aniline on the catalyst also must be markedly reduced. That this unexpected result is also an advantage of the present process is illustrated in the following discussion.

EXAMLE 7

The general procedure of Example 1 is repeated in a number of runs of shorter duration using a reaction chamber temperature of 480° C. In succeeding runs the back pressure is increased and also the feed rate is so adjusted as to maintain about the same average contact time. Illustrative results shown in the following Table V demonstrate the surprising decrease in the amount of coke formed per 100 grams of DPA produced.

*Table V*

| Pressure (p.s.i.g.) | Liquid Hourly Space Velocity | Contact Time (Seconds) | DPA (A) Production | Coke (B) Formation |
|---|---|---|---|---|
| 0 | 78 | 7.0 | 15.1 | 8.9 |
| 15 | 156 | 6.9 | 23.0 | 8.4 |
| 30 | 227 | 7.1 | 28.5 | 5.5 |
| 40 | 275 | 7.2 | 36.0 | 5.1 |
| 50 | 335 | 7.2 | 41.3 | 4.7 |
| 65 | 391 | 7.4 | 42.7 | 4.5 |
| 65 | 400 | 7.2 | 45.6 | 4.5 |
| 100 | 569 | 7.3 | 49.8 | 3.5 |
| 100 | 554 | 7.5 | 54.5 | 3.3 |

(A) = gm./hr./100 cc. cubic centimeters of catalyst.
(B) = gm. aniline lost as coke/100 gms. DPA.

Successful operation however involves not merely obtaining high conversion with low coke loss, the question of DPA produced per unit volume of catalyst per unit time is also important. As noted above, optimum production may not occur under the conditions which produce the maximum conversion rate. This is illustrated also in the following discussion.

EXAMPLE 8

The process of Example 1 was repeated for a number of runs in which both the liquid hourly space velocity feed rate of aniline and the back pressure were varied, the temperature being held at about 480° C. The illustrative results shown in Table VI form part of the basis for the curves of FIGURE 2. Conversion to DPA is presented here as the percent by weight of DPA in the crude product (grams per 100 grams of crude product) and not as the "percent-of-theory" conversation from aniline. The difference is the aniline consumed as coke.

*Table VI*

| Liquid Hourly Space Velocity | Pressure (p.s.i.g.) | Conversion (C) |
|---|---|---|
| 200 | 50 | 15.25 |
| 200 | 80 | 19.0 |
| 200 | 100 | 19.1 |
| 200 | 100 | 18.2 |
| 200 | 120 | 18.5 |
| 200 | 140 | 18.5 |
| 320 | 50 | 13.0 |
| 320 | 80 | 13.8 |
| 320 | 100 | 14.55 |
| 320 | 120 | 14.6 |
| 320 | 140 | 14.5 |
| 400 | 50 | 11.25 |
| 400 | 80 | 9.95 |
| 400 | 100 | 12.1 |
| 400 | 120 | 12.25 |
| 400 | 120 | 11.6 |
| 400 | 140 | 11.52 |

(C) = gm. DPA per 100 gm. condensed product.

Finally, advantages of the present invention can be illustrated by combining data from the foregoing discussion on the basis of requirements to produce 10,000 lbs. of DPA per day. Calculations are based on comparison with full production in one converter at 100 p.s.i.g. It is based on a substantially constant contact time and an average operating temperature of about 480° C., using the catalyst of Examples 1–4. A summary is shown in Table VII.

*Table VII*

| Pressure (p.s.i.g.) | 0 | 40 | 50 | 100 | 150 | 200 |
|---|---|---|---|---|---|---|
| Feed Rate (D) | 575 | 2,100 | 2,370 | 4,600 | 6,600 | 8,600 |
| Conversion (C) (Av. Percent) | 19.1 | 12.8 | 12.0 | 9.1 | 7.0 | 5.7 |
| DPA Production (E) | 2,720 | 6,450 | 6,800 | 10,000 | 11,100 | 11,800 |
| Aniline Loss (F) | 8.9 | 5.1 | 4.8 | 3.3 | 2.5 | 1.9 |
| Converters (G) | 3.7 | 1.6 | 1.5 | 1.0 | 0.9 | 0.85 |

(C) = gm. DPA per 100 gm. condensed product.
(D) = lbs. liquid aniline per hour.
(E) = lbs. DPA per converter per day.
(F) = lbs. aniline per 100 lbs. DPA.
(G) = number required.

The advantages of the present invention are clearly shown in Table VII. It shows also that the conversion rate, however expressed, must not be confused wtih the production obtained from any fixed equipment or catalyst volume. To compete with a single converter operated under about 100 p.s.i.g., operation at zero back pressure, as in the preferred practice of the prior art, would require 3.7 theoretical converters. Overhead and operating cost differentials are very appreciable. Moreover, aniline loss according to the present invention would be reduced from 890 pounds per day to only 330, a saving of some 270%.

Operating practice as to the total number of converters required may vary with circumstances. In general, it has been found preferable to have an even number, half of which are on the production cycle at all times. Other combinations of course may be utilized.

As such, the present invention constitutes a continuation-in-part of my copending application, Serial No. 611,814, filed September 21, 1956, now abandoned; which in turn was a continuation-in-part of my earlier application copending therewith, Serial No. 366,825, filed July 8, 1953, which is now abandoned.

I claim:

1. In a continuous, vapor-phase process for the conversion of aniline to diphenylamine, including the steps of vaporizing liquid aniline, passing resultant aniline vapor through a reaction chamber in direct contact with a deamination catalyst maintained at an elevated temperature and consisting esesntially of at least one oxide of a metal selected from the group consisting of aluminum and titanium, condensing the resultant reacted vapor mixture, separating product diphenylamine from resultant condensate and recycling unreacted aniline; the improvement which comprises the combination of: maintaining said elevated temperature at from above 450° up to about 550° C., maintaining the rate of flow of aniline to said vaporizing step at from about 50 to about 1500 grams per hour per hundred cubic centimeters of said catalyst; and maintaining on said reaction chamber a back pressure of from about 40 to about 200 p.s.i.g.

2. A process according to claim 1, wherein said elevated temperature is maintained at from above 450° up to about 500° C.

3. A process according to claim 1, wherein said back pressure is maintained at from about 50 to about 150 p.s.i.g.

4. A process according to claim 1, wherein said back pressure is maintained at from about 90 to about 130 p.s.i.g.

5. A process according to claim 1, wherein said elevated temperature is maintained at from above 450° up to about 500° C. and said back pressure is maintained at from about 50 to about 150 p.s.i.g.

6. A process according to claim 1, wherein said catalyst has a surface area greater than about 100 square meters per gram.

7. A process according to claim 1 in which the feed rate of aniline is greater than about 55 and less than about 1000 grams per hour per 100 cubic centimeters of catalyst.

References Cited in the file of this patent

UNITED STATES PATENTS

| | | |
|---|---|---|
| 2,098,039 | Hill et al. | Nov. 2, 1937 |
| 2,938,055 | Chow et al. | May 24, 1960 |

FOREIGN PATENTS

| | | |
|---|---|---|
| 752,859 | Great Britain | July 18, 1956 |

UNITED STATES PATENT OFFICE
CERTIFICATE OF CORRECTION

Patent No. 3,118,944             January 21, 1964

Gilbert I. Addis

It is hereby certified that error appears in the above numbered patent requiring correction and that the said Letters Patent should read as corrected below.

Column 5, line 32, for "0.64" read -- 0.65 --.

Signed and sealed this 16th day of June 1964.

(SEAL)
Attest:

ERNEST W. SWIDER             EDWARD J. BRENNER
Attesting Officer             Commissioner of Patents